US008692856B2

(12) United States Patent
Noda

(10) Patent No.: US 8,692,856 B2
(45) Date of Patent: Apr. 8, 2014

(54) PRINT APPARATUS ADAPTED TO MOVE IN A PREDETERMINED DIRECTION AND A REVERSE DIRECTION OF THE PREDETERMINED DIRECTION

(75) Inventor: Yasuo Noda, Fukushima (JP)

(73) Assignee: Oki Data Corporation, Tokyo (JP)

( * ) Notice: Subject to any disclaimer, the term of this patent is extended or adjusted under 35 U.S.C. 154(b) by 1045 days.

(21) Appl. No.: 12/748,783

(22) Filed: Mar. 29, 2010

(65) Prior Publication Data

US 2010/0245854 A1 Sep. 30, 2010

(30) Foreign Application Priority Data

Mar. 30, 2009 (JP) ................................ 2009-081892

(51) Int. Cl.

| | |
|---|---|
| ***B41J 2/00*** | (2006.01) |
| ***G06K 15/10*** | (2006.01) |
| ***B41J 33/14*** | (2006.01) |
| ***B41J 33/38*** | (2006.01) |

(52) U.S. Cl.

CPC . *B41J 33/14* (2013.01); *B41J 33/38* (2013.01)
USPC ........................................... 347/188; 358/1.5

(58) Field of Classification Search

CPC ................................. B41J 33/14; B41J 33/38
USPC .......... 347/37, 188; 400/120.01, 225; 358/1.5
See application file for complete search history.

(56) References Cited

U.S. PATENT DOCUMENTS

| | | | | |
|---|---|---|---|---|
| 4,728,206 | A * | 3/1988 | Mori et al. | 400/225 |
| 6,264,382 | B1 * | 7/2001 | Buxton et al. | 400/120.01 |
| 8,007,190 | B2 * | 8/2011 | McNestry et al. | 400/120.01 |
| 8,330,780 | B2 * | 12/2012 | Hart | 347/188 |
| 2006/0227165 | A1 * | 10/2006 | Starkey | 347/37 |

FOREIGN PATENT DOCUMENTS

JP 08192560 A 7/1996

* cited by examiner

*Primary Examiner* — Alessandro Amari
*Assistant Examiner* — Carlos A Martinez
(74) *Attorney, Agent, or Firm* — Panitch Schwarze Belisario & Nadel LLP

(57) ABSTRACT

A print apparatus is supplied capable of preventing print density unevenness. In the print apparatus that prints by moving a print head with respect to an ink ribbon that is rotated and transported in a predetermined direction, a controller analyzes print data, and performs one direction print by moving the print head in a reverse direction opposite to the predetermined direction on the basis of the analysis result.

12 Claims, 14 Drawing Sheets

*PRIOR ART*

*PRIOR ART*

PRINT APPARATUS ADAPTED TO MOVE IN A PREDETERMINED DIRECTION AND A REVERSE DIRECTION OF THE PREDETERMINED DIRECTION

FIELD OF THE INVENTION

The invention relates to a print apparatus that has print density unevenness prevention function, especially, relates to a print apparatus of serial impact dot matrix method.

BACKGROUND OF THE INVENTION

Generally, in the former print apparatus, a print head that is a record means is loaded onto a part called a carriage, and an image is recorded through performing round moving and impacting of the print head in a width direction of print paper that is orthogonal with a transport direction of the print paper. At that time, the print head protrudes a plurality of dot pin wires, and performs a print through transferring ink of an ink ribbon from a ribbon mask hole of a ribbon protector to the paper inhaled between a platen and the ribbon protector.

Then, in this kind of print apparatus, a mechanism (for example, referring to patent document 1) is furnished in which the ink ribbon is always sent in a direction, the carriage and a ribbon drive axle is driven by a motor, and the ink ribbon is sent in a feed amount that is less than a feed amount of a carriage so as to keep relativity movement speed of the ink ribbon with respect to the print head constant for using the whole in ribbon uniformly. For example, the mechanism is furnished that transports drive power from the carriage to the ribbon drive axle so that the feed amount of the ink ribbon becomes ⅓ when the feed amount of the carriage is served as 1.

Patent document 1: Japan patent publication of No. 08-192560

However, in the former print apparatus, when the print is performed by moving the carriage only "A" in a positive direction (same direction) with respect to the ink ribbon movement direction, because only "A/3" of the ink ribbon is sent, the ribbon use region becomes "A−(A/3)" and the print is performed by repeatedly impacting on the narrow ribbon use region with respect to a print movement amount "A", a print result becomes to be light (FIG. 6).

On the other condition, when the print is performed by moving the carriage only "A" in a reverse direction with respect to the ink ribbon movement direction, because only "A/3" of the ink ribbon is sent, the ribbon use region becomes "A+(A/3)", and the print is performed by not repeatedly impacting on the wide ribbon use region with respect to a print movement amount "A", a print result becomes to be dark (FIG. 7).

Therefore, when such print of the positive direction and the reverse direction is repeated, because one part of the ink ribbon is used repeatedly there is a problem that print density unevenness occurs.

This kind of the print density unevenness is not a serious problem when a character data whose density is low is printed. However, when an image data whose density is high is printed, the print density unevenness will remarkably appear.

SUMMARY OF THE INVENTION

It is, therefore, an object of the invention to provide a print apparatus capable of preventing the print density unevenness to solve the above problem.

That is, an aspect of the invention is to provide a print apparatus that prints by moving a print head with respect to an ink ribbon that is rotated and transported in a predetermined direction, comprising: a controller that analyzes print data; and performs one direction print by moving the print head in a reverse direction opposite to the predetermined direction on the basis of the analysis result.

THE EFFECT OF THE PRESENT INVENTION

According to the present invention, because a print apparatus that prints by moving a print head with respect to an ink ribbon that is rotated and transported in a predetermined direction, comprises a controller that analyzes print data and performs one direction print by moving the print head in a reverse direction opposite to the predetermined direction on the basis of the analysis result, when image data whose density is high is printed, it is possible to prevent print density unevenness through repetition of print in the positive direction and the reverse direction.

The above and other objects and features of the present invention will become apparent from the following detailed description and the appended claims with reference to the accompanying drawings.

BRIEF DESCRIPTION OF THE DRAWINGS

FIG. 3A is a third diagram for explaining a print operation in settings of step S03 in embodiment 1;

DETAILED DESCRIPTION OF THE PREFERRED EMBODIMENTS

Embodiments of the invention will be described in detail hereinbelow with reference to the drawings.

Embodiment 1

(Structure)

Figure 2:
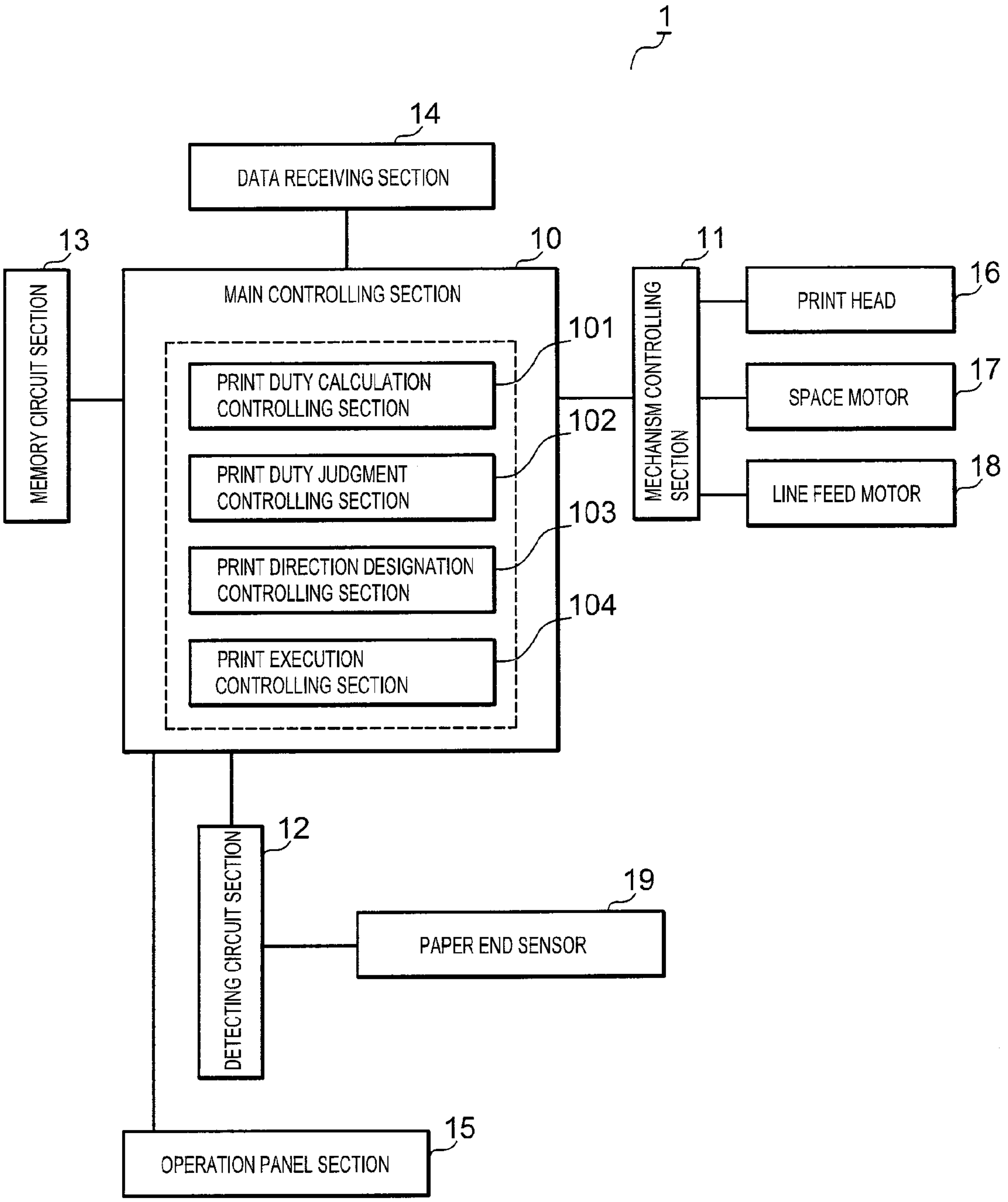
FIG. 2 is a structural diagram of a print apparatus of embodiment 1.

As shown by FIG. 2, a print apparatus 1 of embodiment 1 comprises a main controlling section 10, a mechanism controlling section 11, a detecting circuit section 12, a memory circuit section 13, a data receiving section 14 and an operation panel section 15.

The data receiving section 14 performs receiving of all kinds of data from an upper apparatus (not shown), and performs sending and receiving of a control signal with the upper apparatus.

The main controlling section 10 receives control data, print data and control signal from the upper apparatus through the data receiving section 14, performs analysis of the control data, the print data and the control signal that were received, and performs expansion in an image buffer.

Further, the main controlling section 10 includes a print duty calculation controlling section 101 that calculates print duty of one line part of print data expanded in the image buffer, a print duty judgment controlling section 102 that judges whether or not the calculated print duty is over a predetermined threshold, a print direction designation controlling section 103 that performs designation of a print direction and a print start position, and a print execution controlling section 104 for instructing the mechanism controlling section 11 to execute print. In the present embodiment, respective control sections of 101~104 are materialized through firmware.

The mechanism controlling section 11 controls a print head 16 that contains a plurality of dot pin wires, a space motor 17 that moves the print head 16 in a width direction of print paper and a line feed motor 18 that performs line feed movement in a transport direction (orthogonal direction with the width direction of print paper) of print paper, for printing a fixed dot pattern that is generated by the main controlling section 10.

The detecting circuit section 12 receives a detecting signal from a paper end sensor 19 for detecting a tip position and an end position of paper.

The memory circuit section 13 includes a buffer memory for accumulating print data sent from the main controlling section 10, and for expanding print data in the image buffer in the case to print the print data. Furthermore, the memory circuit section 13 also includes a non-volatilization memory for storing set up mode that is selected in the operation panel section 15.

The operation panel section 15 includes operation keys (not shown) for setting up operation mode information and the like, a LED lamp and a LCD display panel for displaying an operation condition.

(Operation)

Figure 1:
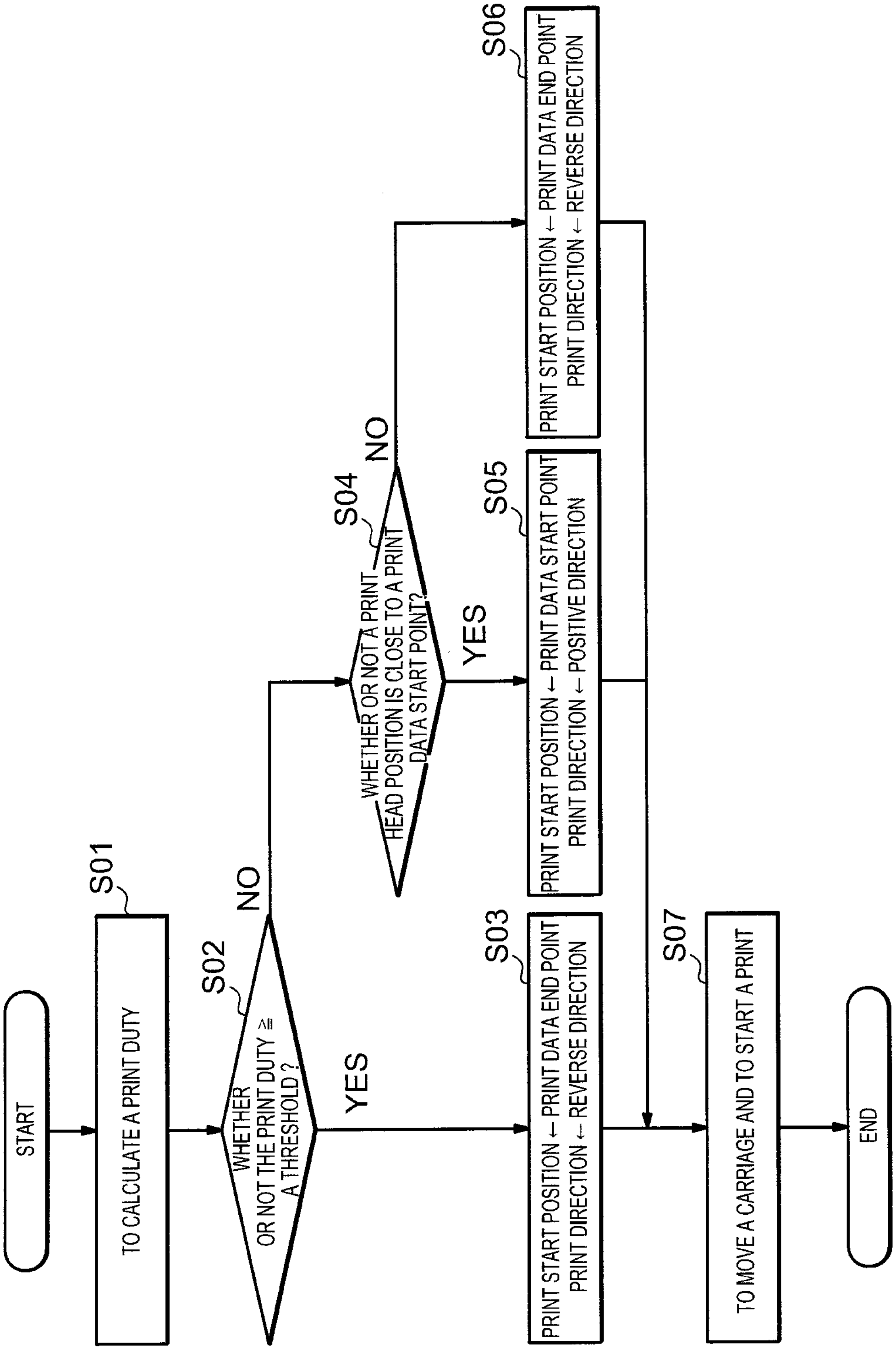
FIG. 1 is a flow chart for explaining control of a print apparatus of embodiment 1.

According to the above structure, the print apparatus 1 of embodiment 1 operates as mentioned later. It is to explain the operation by every step started from "S" later in detail by using a control flow chart of FIG. 1.

Firstly, in the main controlling section 10, after the print data received from the upper apparatus is analyzed and the expansion of one line part of the print data is completed in the image buffer, the print duty calculation controlling section 101 calculates print duty of the print data (step S01). That is, through the image buffer, every one column of data is taken out, all dot numbers for performing impact are added, and ratio of impact dot number with respect to print width is calculated.

Next, the print duty judgment controlling section 102 judges whether or not the calculated print duty is over a threshold that has been previously calculated on experiment and the like (step S02). For example, in the case that it is considered that the load with respect to an ink ribbon becomes high when the print duty is over 70%, the threshold should be set to 70%. If it is set like so, usually, because the print duty is within 30~50% in the case of the print data of character base as characters and the like, it is not judged that the calculated print duty is over the threshold, in the case of the print data of the image base as drawing data and the like, it becomes to be judged that the calculated print duty is over the threshold.

Next, in the step S02 mentioned above, in the case that the calculated print duty is over the predetermined threshold, the print direction designation controlling section 103 designates a print start position on a print data end point position; and designates a print direction in a reverse direction with respect to the ink ribbon movement direction (step S03).

Further, in the step S02 mentioned above, in the case that the calculated print duty is under the predetermined threshold, the print direction designation controlling section 103 judges whether or not the present position of the print head 16 is close to the side of a print data start point position comparing with a print data end point position (step S04). When it is judged that the present position is close to the print data start point position, the print direction designation controlling section 103 designates a print start position on the print data start point position; and designates a print direction in a positive direction with respect to the ink ribbon movement direction (step S05), when it is judged that the present position is not close to the print data start point position, the print direction designation controlling section 103 designates a print start position on the print data end point position; and designates a print direction in a reverse direction with respect to the ink ribbon movement direction (step S06).

Next, the print execution controlling section 104, after moved a carriage (the print head 16) to the designated print start position, performs an instruction to the mechanism controlling section 11 so as to start print in the designated print direction, and the print is actually performed (step S07).

Further, it is to explain a print operation in detail through settings in respective steps.

Figure 3A:
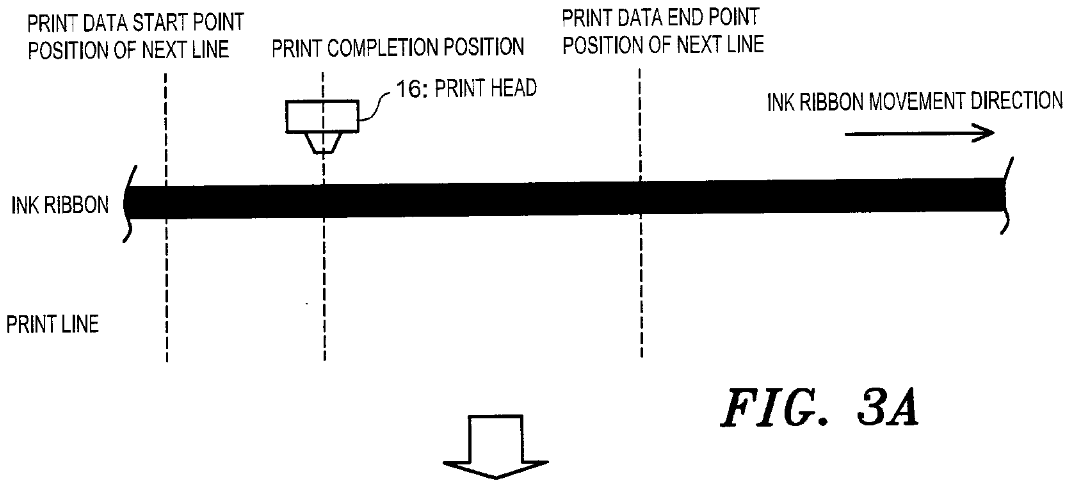
FIG. 3A is a first diagram for explaining a print operation in settings of step S03 in embodiment 1.
Figure 3B:
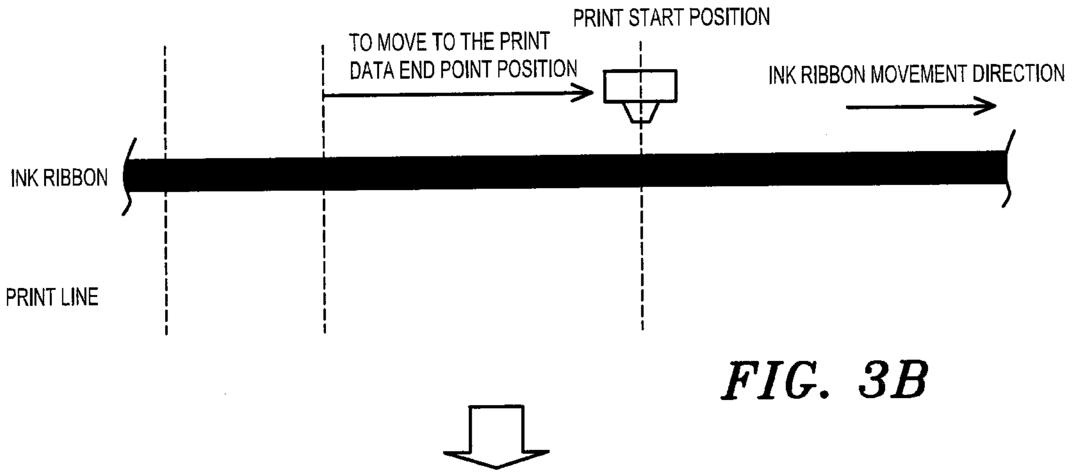
FIG. 3B is a second diagram for explaining a print operation in settings of step S03 in embodiment 1.
Figure 3C:
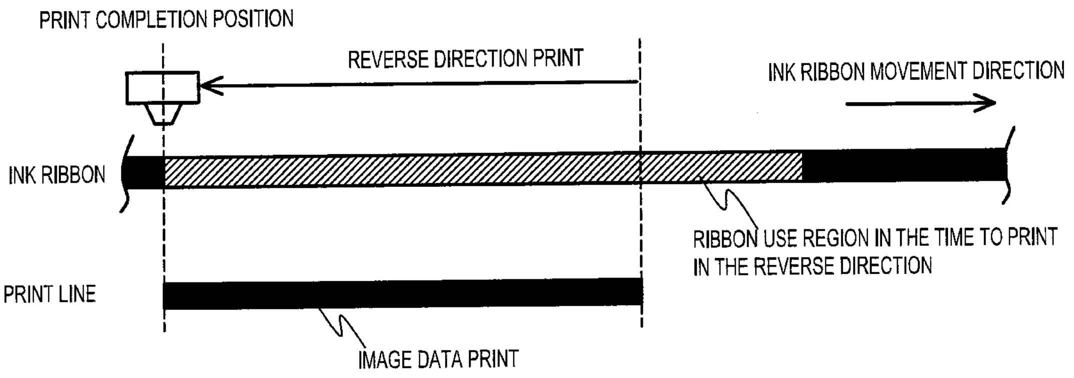

In the case of setting in step S03, firstly, the print head 16 stops on a print completion position (FIG. 3A). Next, the print head 16 is moved to the print data end point position that is served as a print start position (FIG. 3B). Next, image data print is performed in the reverse direction with respect to the ink ribbon movement direction, and then print for one line is completed by stopping the print head 16 on the print completion position (FIG. 3C).

Figure 4A:
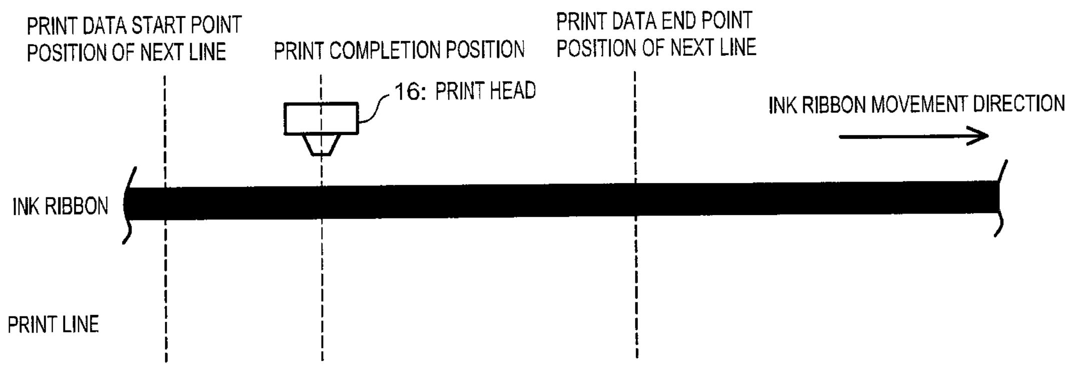
FIG. 4A is a first diagram for explaining a print operation in settings of step S05 in embodiment 1.
Figure 4B:
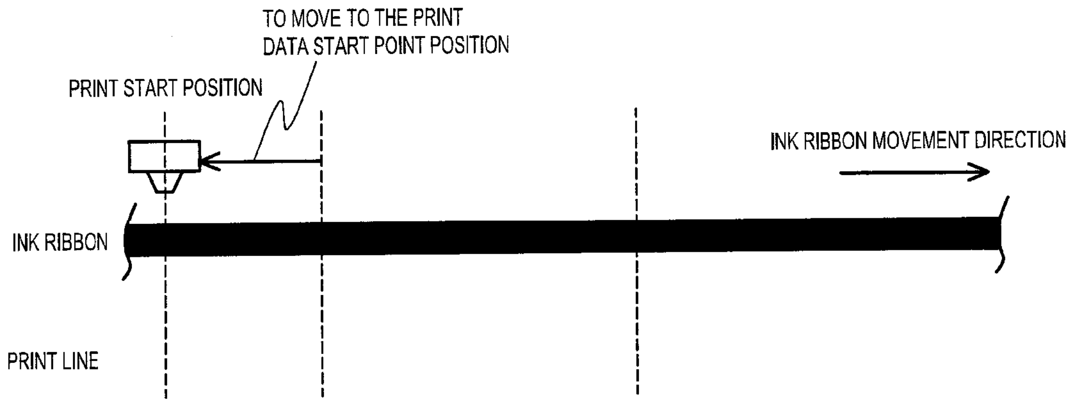
FIG. 4B is a second diagram for explaining a print operation in settings of step S05 in embodiment 1.
Figure 4C:
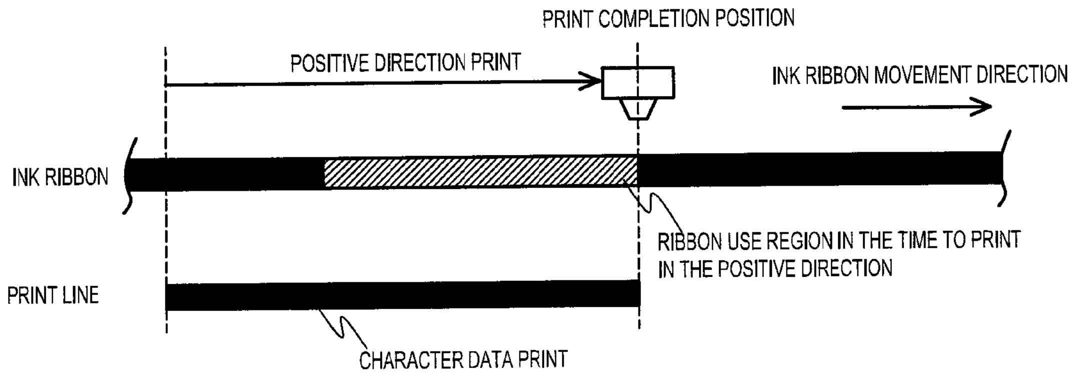
FIG. 4C is a third diagram for explaining a print operation in settings of step S05 in embodiment 1.

In the case of setting in step S05, firstly, the print head 16 stops on the print completion position (FIG. 4A). Next, the print head 16 is moved to the side of the print data start point position that is close to the present position of the print head 16, and that is served as a print start position (FIG. 4B). Next, character data print is performed in the positive direction with respect to the ink ribbon movement direction, and then print for one line is completed by stopping the print head 16 on the print completion position (FIG. 4C).

Figure 5A:
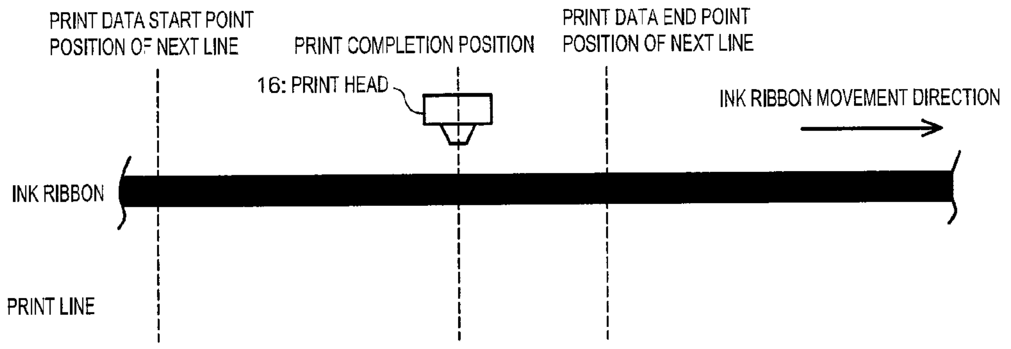
FIG. 5A is a first diagram for explaining a print operation in settings of step S06 in embodiment 1.
Figure 5B:
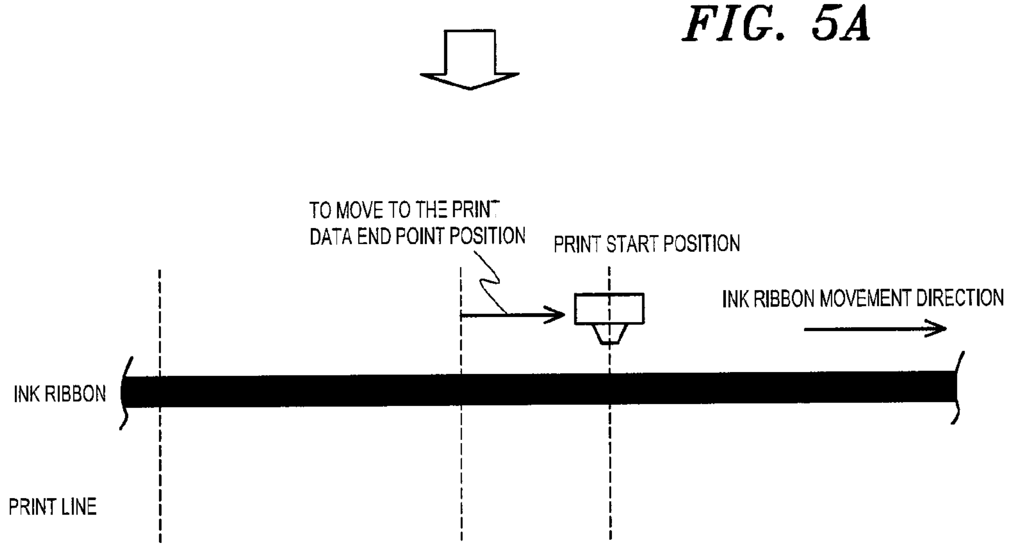
FIG. 5B is a second diagram for explaining a print operation in settings of step S06 in embodiment 1.
Figure 5C:
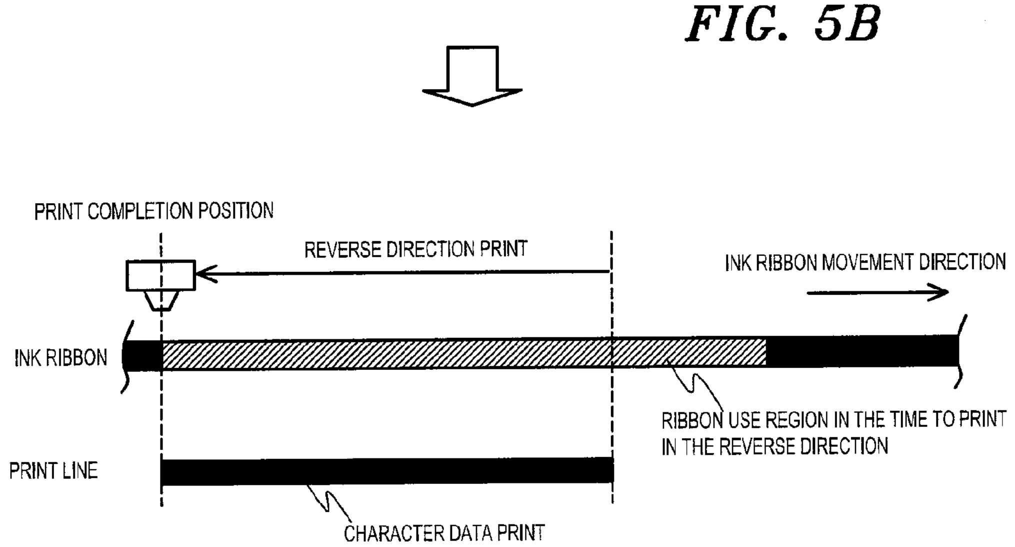
FIG. 5C is a third diagram for explaining a print operation in settings of step S06 in embodiment 1.
Figure 6A:
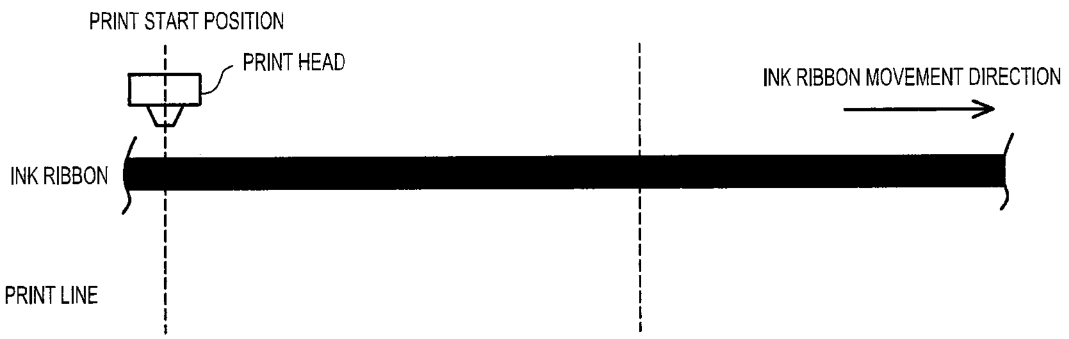
FIG. 6A is a diagram showing a former positive direction print in print start time.
Figure 6B:
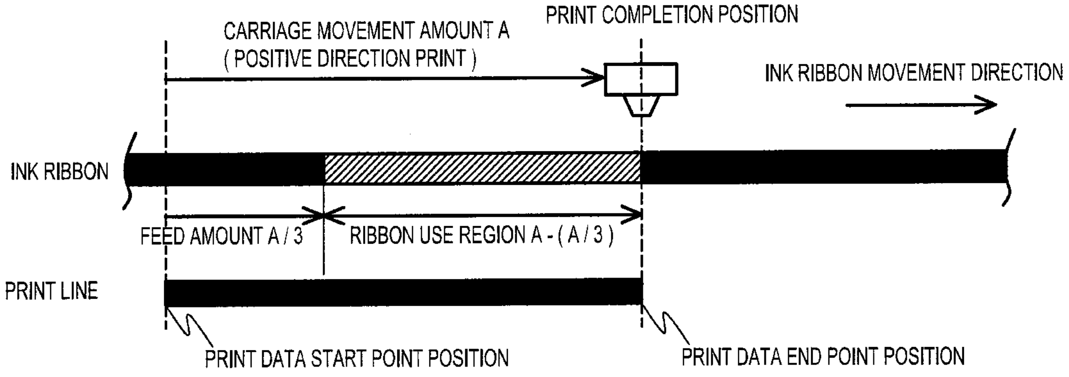
FIG. 6B is a diagram showing a former positive direction print in print completion time.
Figure 6C:
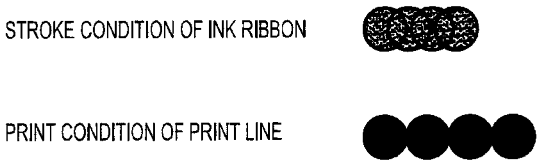
FIG. 6C is a diagram showing an ink ribbon stroke condition and a print condition of a print line in a former positive direction print.
Figure 7A:
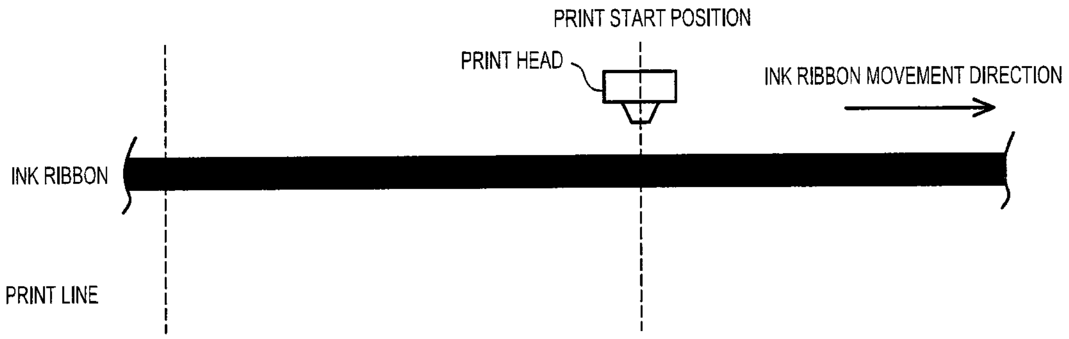
FIG. 7A is a diagram showing a former reverse direction print in print start time.
Figure 7B:
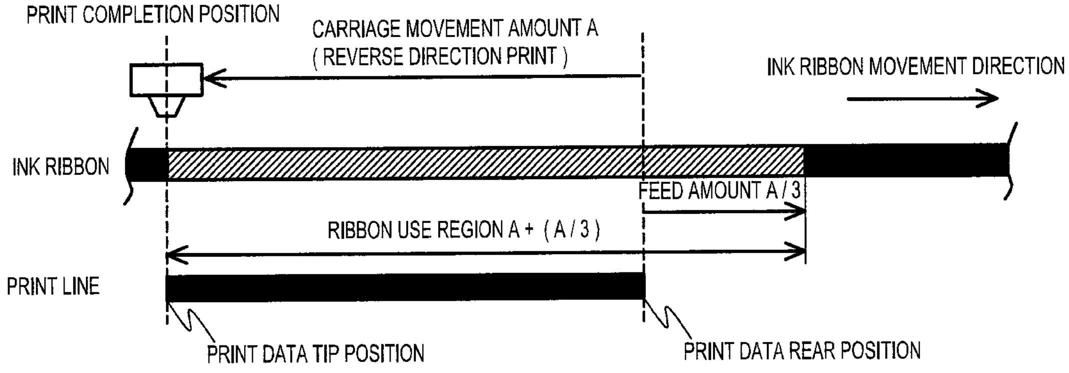
FIG. 7B is a diagram showing a former reverse direction print in print completion time.
Figure 7C:
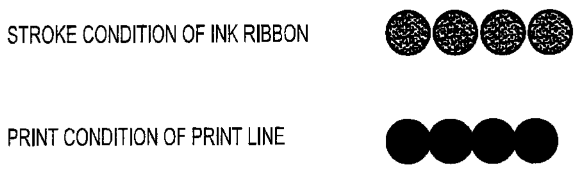
FIG. 7C is a diagram showing an ink ribbon stroke condition and a print condition of a print line in a former reverse direction print.

In the case of setting in step S06, firstly, the print head 16 stops on the print completion position (FIG. 5A). Next, the print head 16 is moved to the side of the print data end point position that is close to the present position of the print head 16, and that is served as a print start position (FIG. 5B). Next, character data print is performed in the reverse direction with respect to the ink ribbon movement direction, and then print for one line is completed by stopping the print head 16 on the print completion position (FIG. 5C).

(Effect of Embodiment 1)

According to the print apparatus 1 of the embodiment 1 that is mentioned above in detail, because a print apparatus that prints by moving a print head with respect to an ink ribbon that is rotated and transported in a predetermined direction, comprises a controller that performs one direction print by moving the print head in a reverse direction opposite to the predetermined direction in the case that print duty of the print line is over a predetermined threshold, when image data whose density is high is printed, it is possible to prevent print density unevenness through repetition of print in the positive direction and the reverse direction.

Here, in the embodiment 1, as shown by FIG. 14, through repeatedly using one part of the ink ribbon, there is a case that print density unevenness occurs in the same line.

Figure 14A:
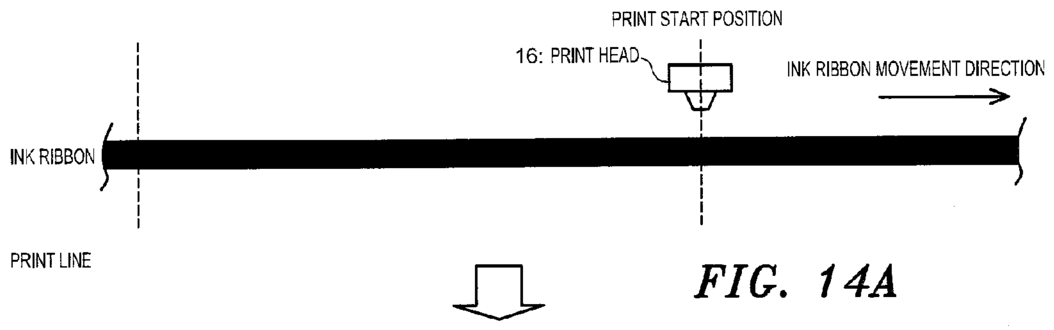
FIG. 14A is a first diagram for explaining a print operation of a print apparatus of embodiment 1.
Figure 14B:
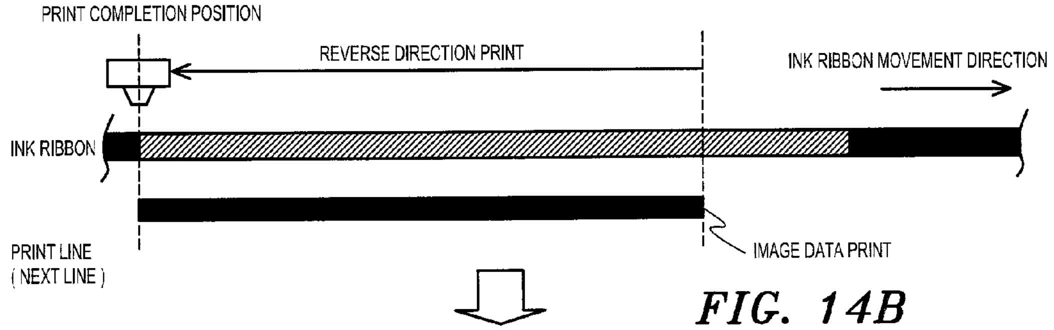
FIG. 14B is a second diagram for explaining a print operation of a print apparatus of embodiment 1.
Figure 14C:
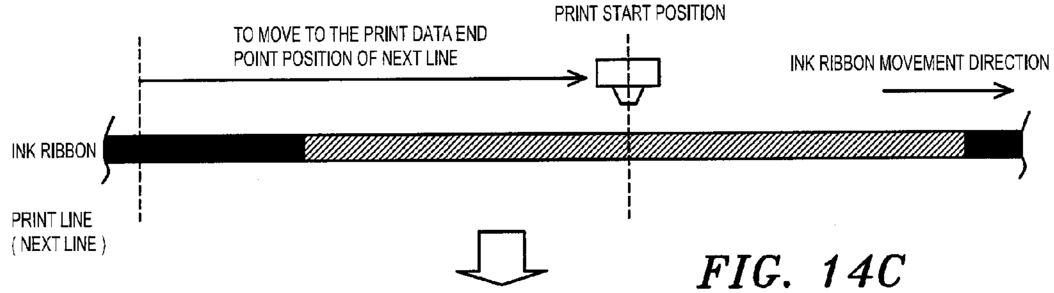
FIG. 14C is a third diagram for explaining a print operation of a print apparatus of embodiment 1.

Firstly, the print head 16 stops on the print start position (FIG. 14A). Next, through moving the print head 16, the image data print is performed in the reverse direction with respect to the ink ribbon movement direction, and the print head 16 is stopped on the print completion position (FIG. 14B). Next, the print head 16 is moved to the print data end point position of the next line that is served as the print start position of the next line (FIG. 14C). Next, through moving the print head 16, the image data print is performed in the reverse direction with respect to the ink ribbon movement direction, and then the print for the next line is completed by stopping print head 16 on the print completion position (FIG. 14D).

Figure 14D:
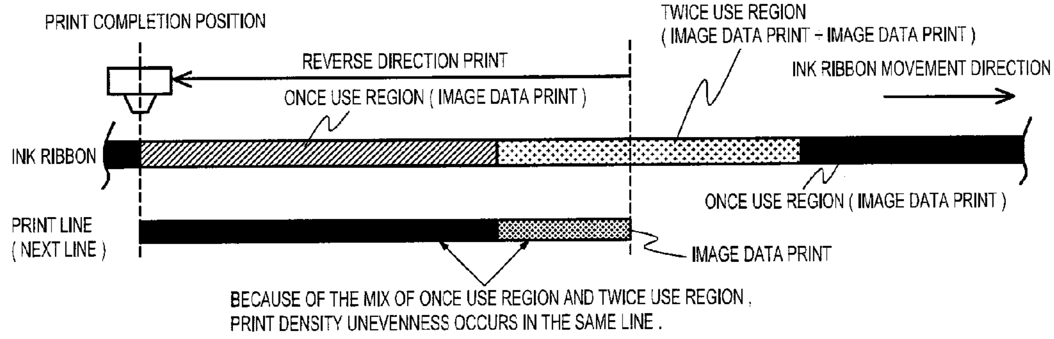
FIG. 14D is a fourth diagram for explaining a print operation of a print apparatus of embodiment 1.

With respect to the reverse direction print in FIG. 14D, because it becomes the image data print that uses the ink ribbon of once use and the ink ribbon of twice use and density difference occurs between both the ink ribbons, print density unevenness occurs in the same line.

Adding to the effect of the embodiment 1, embodiment 2 includes a means that prevents this kind of print density unevenness.

Embodiment 2

(Structure)

Figure 8:
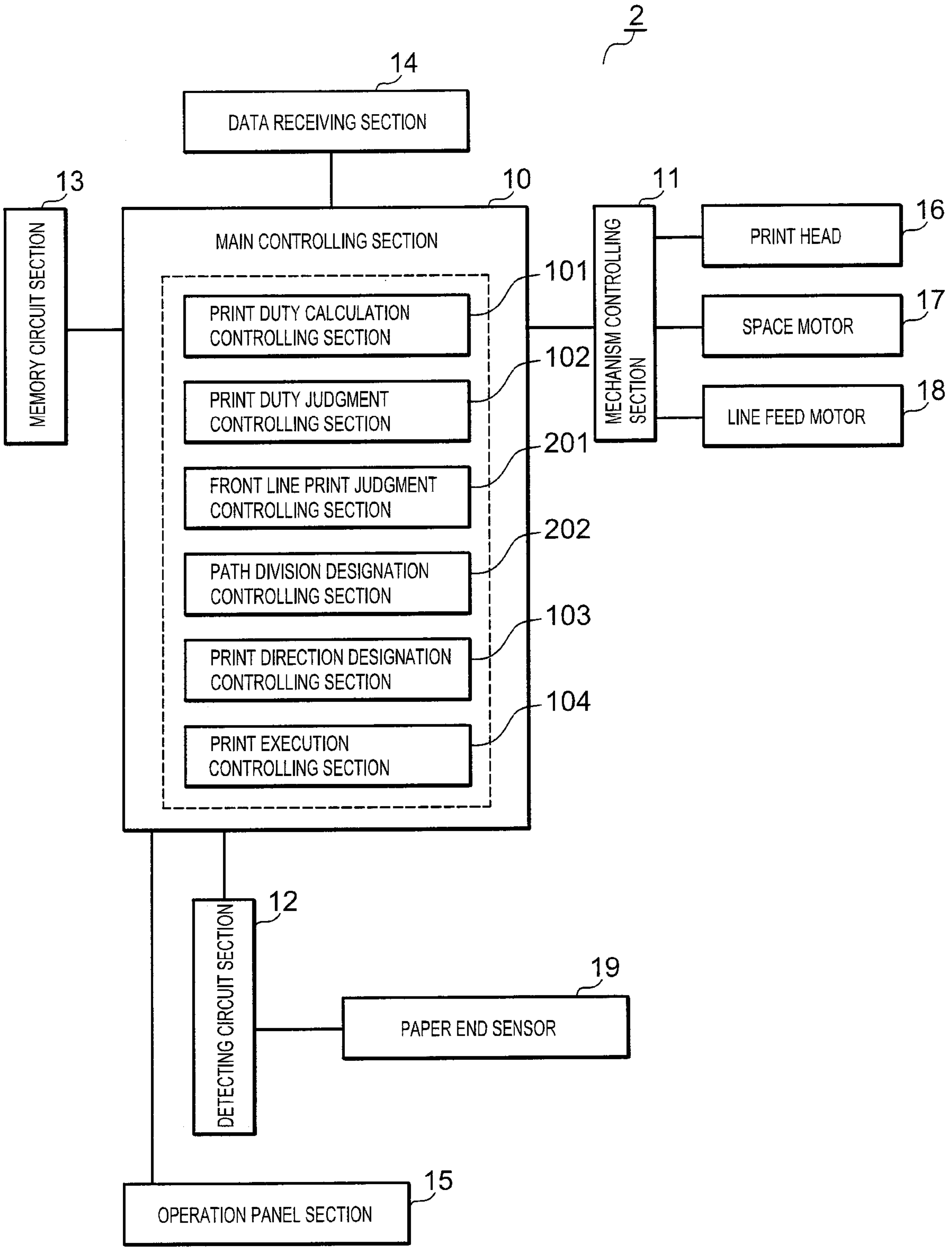
FIG. 8 is a structural diagram of a print apparatus of embodiment 2.

A print apparatus of the embodiment 2, as shown by FIG. 8, has a structure in which a front line print judgment controlling section 201 that performs judgment whether or not a front line is a high line of print duty and a path division designation controlling section 202 that performs designation of path division print are added in the main controlling section 10, with respect to the structure of the embodiment 1.

Here, the path division print performs print by dividing one line of data into twice, for example, the first print uses odd number dot pin wires (#1, #3, #5 . . . ), the second print performs print by using even number dot pin wires (#2, #4, #6 . . . ).

Moreover, in the present embodiment, similarly to the embodiment 1, respective controlling sections of 101~104, 201 and 202 are materialized through firmware.

(Operation)

Figure 9:
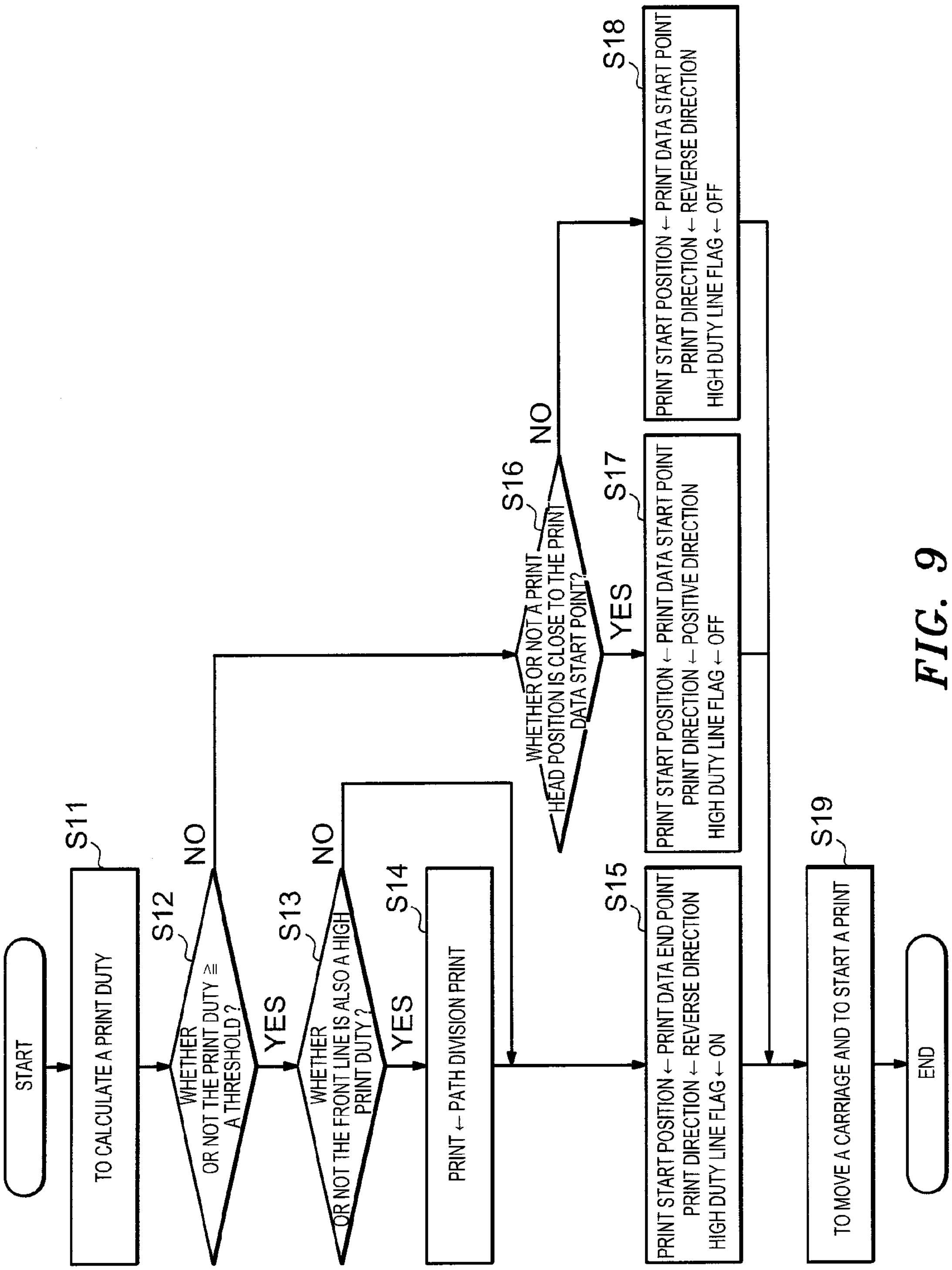
FIG. 9 is a flow chart for explaining control of a print apparatus of embodiment 2.

According to the structure mentioned above, the print apparatus 2 of the embodiment 2 operates as mentioned later. It is to explain the operation by every step started from "S" later in detail by using a control flow chart of FIG. 9.

Firstly, in the main controlling section 10, after print data received from an upper apparatus is analyzed and expansion of one line part of the print data is completed in the image buffer, the print duty calculation controlling section 101 calculates print duty of the print data (step S11). That is, through the image buffer, every one column of data is taken out, all dot numbers for performing impact are added, and ratio of impact dot number with respect to print width is calculated.

Next, the print duty judgment controlling section 102 judges whether or not the calculated print duty is over a threshold that has been previously calculated on experiment and the like (step S12). For example, in the case that it is considered that the load with respect to an ink ribbon becomes high when the print duty is over 70%, the threshold should be set to 70%. If it is set like so, usually, because the print duty is within 30~50% in the case of the print data of character base as characters and the like, it is not judged that the calculated print duty is over the threshold, in the case of the print data of the image base as drawing data and the like, it becomes to be judged that the calculated print duty is over the threshold.

Next, in the step S12 mentioned above, in the case that the calculated print duty is over the predetermined threshold, the front line print judgment controlling section 201 judges whether or not a front line also has a high print duty through ON (1)/OFF (0) of a high duty line flag that is set in step S16 or S19 mentioned later (step S13). In the step S13 mentioned above, in the case of the high duty line flag ON (1), the path division designation controlling section 202 designates path division print (step S14), in the case of the high duty line flag OFF (0), the step is shifted to the step S15 mentioned later.

Next, the print direction designation controlling section 103 designates a print start position on a print data end point position; and designates the print direction on a reverse direction with respect to an ink ribbon movement direction, and sets the high duty line flag to ON (1) (step S15).

Further, in the step S12 mentioned above, in the case that the calculated print duty is under the predetermined threshold, the print direction designation controlling section 103 judges whether or not the present position of the print head 16 is close to the side of a print data start point position comparing with the print data end point position (step S16). When it is judged that the present position is close to the print data start point position, after the print start position is designated on the print data start point position and the print direction is designated in a positive direction with respect to the ink ribbon movement direction, the high duty line flag is set to OFF (0) (step S17), when it is judged that the present position is not close to the print data start point position, after the print start position is designated on the print data end point position and the print direction is designated in a reverse direction with respect to the ink ribbon movement direction, the high duty line flag is set to OFF (0) (step S18).

Next, the print execution controlling section 104, after moved the carriage (the print head 16) to the designated print start position, performs an instruction to the mechanism controlling section 11 so as to start print in the designated print direction, and the print is actually performed (step S19).

Further, it is to explain a print operation in detail through settings in respective steps.

Figures 10A, 10B, 10C, 10D, 10E:
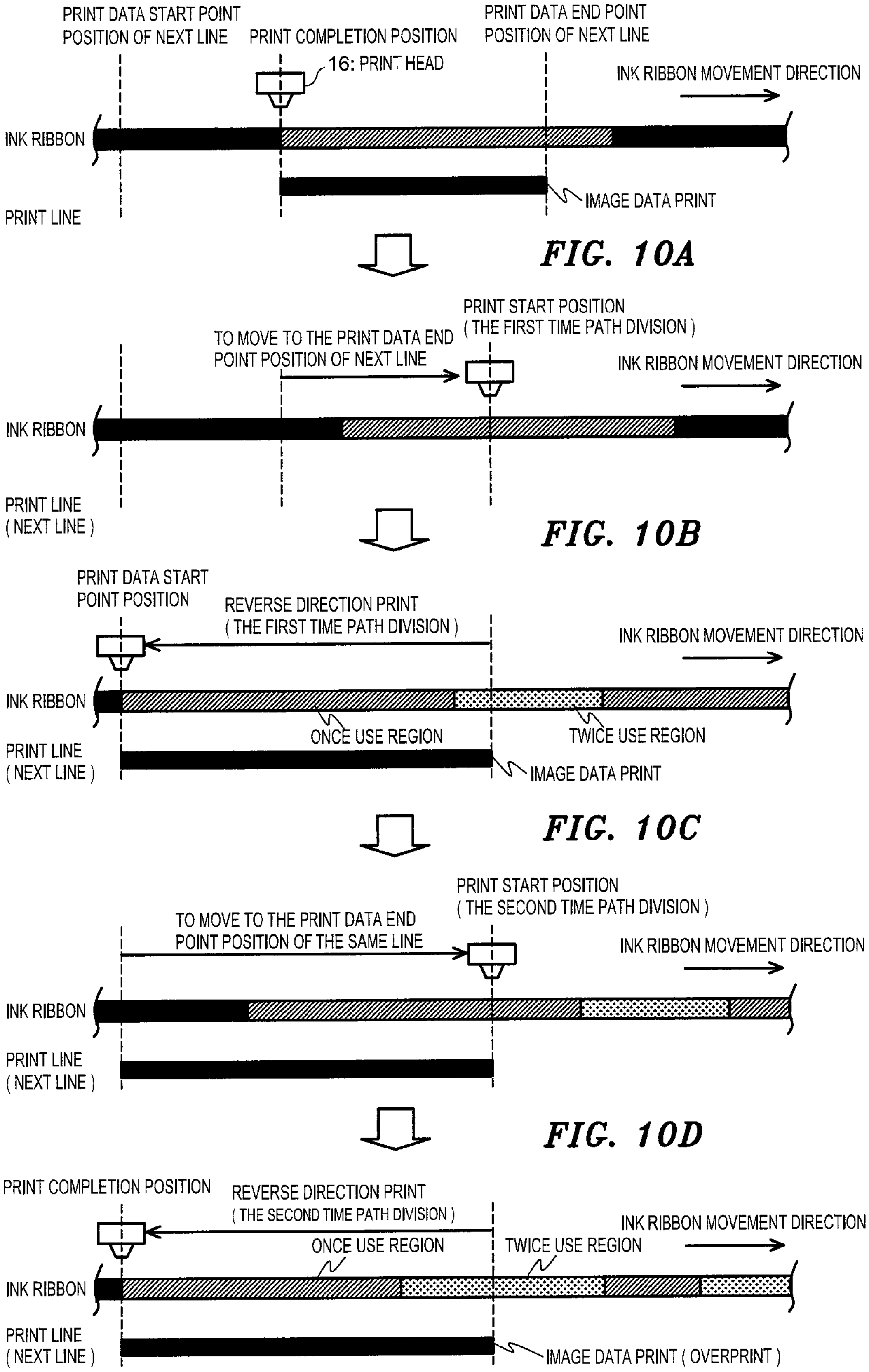
FIG. 10A is a first diagram for explaining a print operation of steps S12→S13→S14→S15 in embodiment 2.
FIG. 10B is a second diagram for explaining a print operation of steps S12→S13→S14→S15 in embodiment 2.
FIG. 10C is a third diagram for explaining a print operation of steps S12→S13→S14→S15 in embodiment 2.
FIG. 10D is a fourth diagram for explaining a print operation of steps S12→S13→S14→S15 in embodiment 2.
FIG. 10E is a fifth diagram for explaining a print operation of steps S12→S13→S14→S15 in embodiment 2.

In the case of settings in steps S12, S13, S14 and S15, firstly, after the image data print is completed, the print head 16 stops on a print completion position (FIG. 10A). Next, the print head 16 is moved to the print data end point position of the next line that is served as a print start position (FIG. 10B). Next, image data print is performed through the first path division in the reverse direction with respect to the ink ribbon movement direction, and then the print head 16 is stopped on the print data start point position (FIG. 10C). Next, the print head 16 is made to move to the print data end point position of the same line that is served as the print start position (FIG. 10D). Next, image data print is performed through the second path division in the reverse direction with respect to the ink ribbon movement direction, and then print for one line is completed by stopping the print head 16 on the print completion position (FIG. 10E).

Moreover, in the time of the reverse direction print of FIG. 10C and FIG. 10E, although it becomes the image data print that uses the ink ribbon of once use and the ink ribbon of twice use, because twice print is performed through the path division, print impact is scattered into ½ and print density unevenness in one line is restrained to a degree capable of being ignored in the time of the image data print.

Figure 11A:
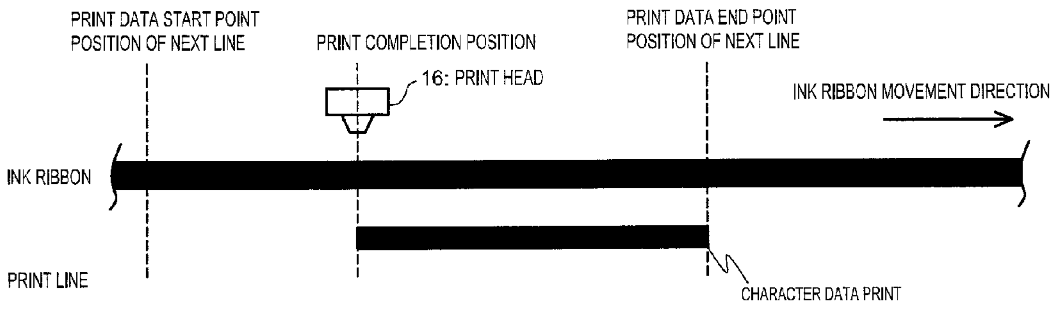
FIG. 11A is a first diagram for explaining a print operation of steps S12→S13→S15 in embodiment 2.
Figure 11B:
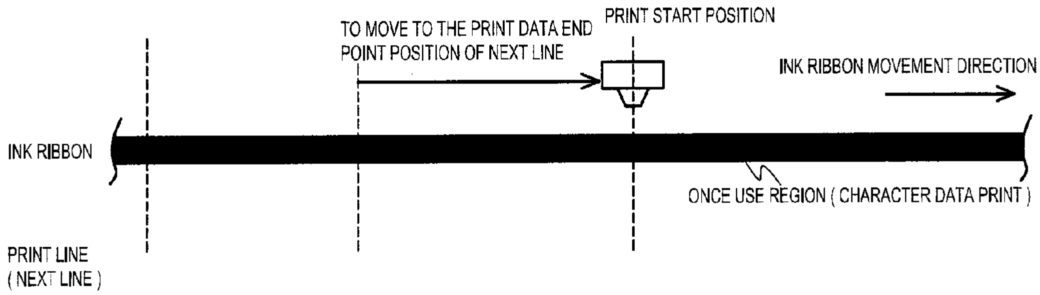
FIG. 11B is a second diagram for explaining a print operation of steps S12→S13→S15 in embodiment 2.

In the case of settings in steps S12, S13 and S15, firstly, after the character data print is completed, the print head 16 stops on the print completion position (FIG. 11A). Next, the print head 16 is moved to the print data end point position of the next line that is served as a print start position (FIG. 11B). Next, image data print is performed in the reverse direction with respect to the ink ribbon movement direction, and then print for one line is completed by stopping the print head 16 on the print completion position (FIG. 11C).

Figure 11C:
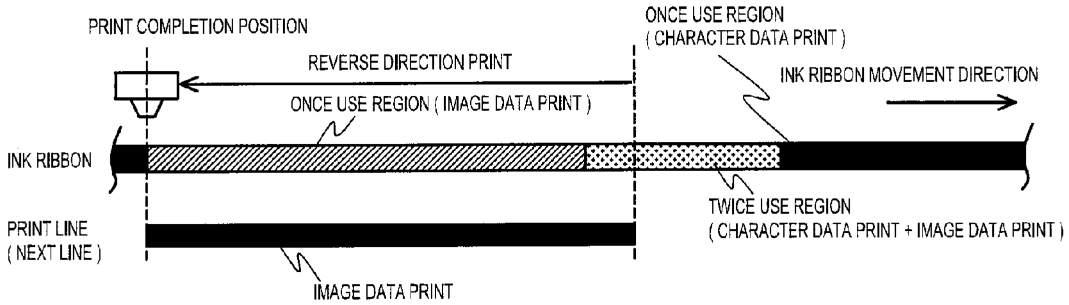
FIG. 11C is a third diagram for explaining a print operation of steps S12→S13→S15 in embodiment 2.

Moreover, in the time of the reverse direction print of FIG. 11C, although it becomes the image data print that uses the ink ribbon of once use and the ink ribbon of twice use, because print duty is low in the case of the character data print comparing with the case of the image data print and density difference between the ink ribbon of once use (the first time: character data print) and the ink ribbon of twice use (the first time: character data print; the second time: image data print) is small, print density unevenness in the same line is restrained to a degree capable of being ignored in the time of the image data print.

Figure 12A:
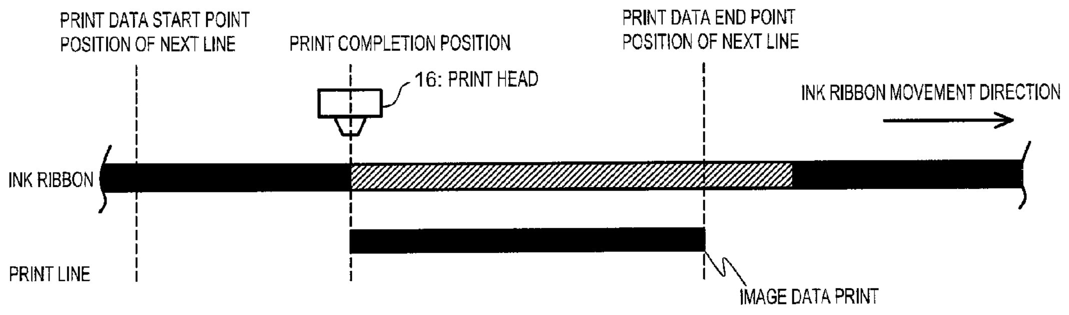
FIG. 12A is a first diagram for explaining a print operation of steps S12→S16→S17 in embodiment 2.
Figure 12B:
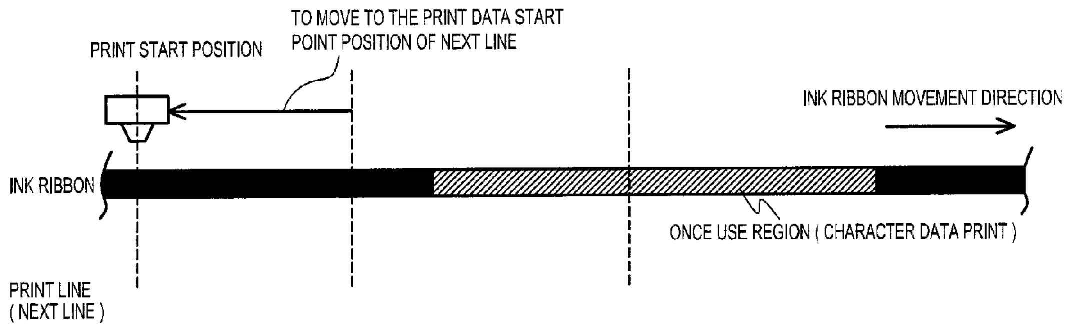
FIG. 12B is a second diagram for explaining a print operation of steps S12→S16→S17 in embodiment 2.

In the case of settings in steps S12, S16 and S17, firstly, after the image data print is completed, the print head 16 stops on the print completion position (FIG. 12A). Next, the print head 16 is moved to the side of the print data start point position that is close to the present position of the print head 16, and that is served as a print start position (FIG. 12B). Next, character data print is performed in the positive direction with respect to the ink ribbon movement direction, and then print for one line is completed by stopping the print head 16 on the print completion position (FIG. 12C).

Figure 12C:
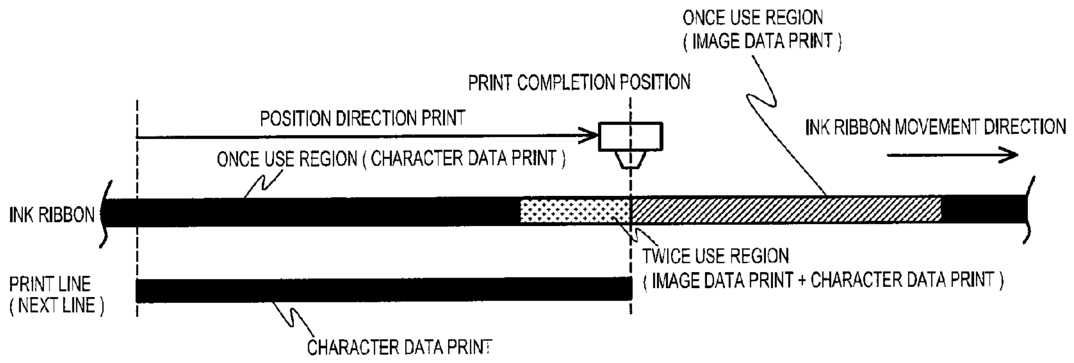
FIG. 12C is a third diagram for explaining a print operation of steps S12→S16→S17 in embodiment 2.

Moreover, in the time of the positive direction print of FIG. 12C, although it becomes the character data print that uses the ink ribbon of once use and the ink ribbon of twice use, because print duty is low in the case of the character data print comparing with the case of the image data print, print density unevenness in the same line is restrained to a degree capable of being ignored in the time of the character data print.

Figure 13A:
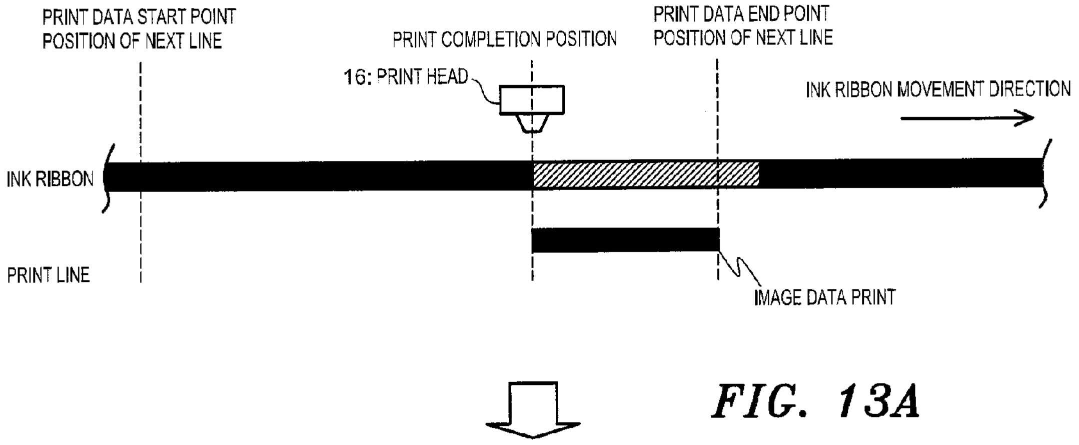
FIG. 13A is a first diagram for explaining a print operation of steps S12→S16→S18 in embodiment 2.
Figure 13B:
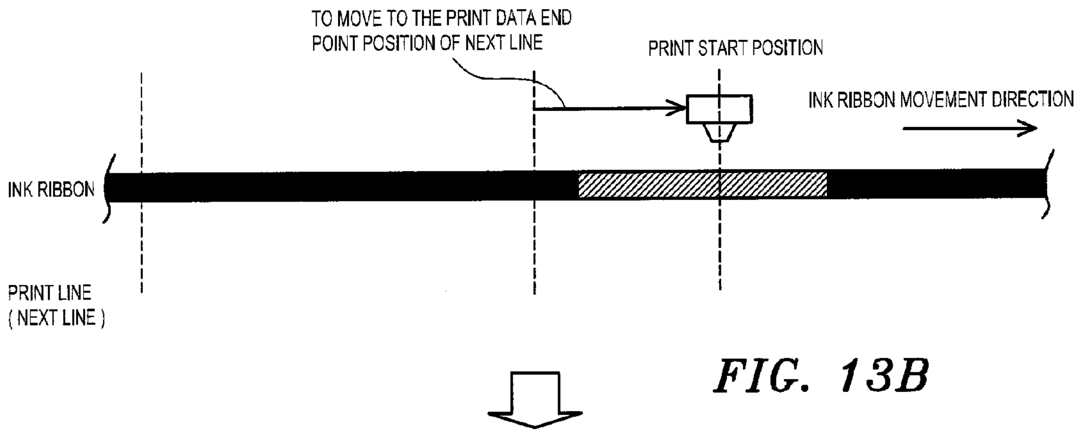
FIG. 13B is a second diagram for explaining a print operation of steps S12→S16→S18 in embodiment 2.

In the case of settings in steps S12, S16 and S18, firstly, after the image data print is completed, the print head 16 stops on the print completion position (FIG. 13A). Next, the print head 16 is moved to the side of the print data end point position that is close to the present position of the print head 16, and that is served as a print start position (FIG. 13B). Next, the character data print is performed in the reverse direction with respect to the ink ribbon movement direction, and then print for one line is completed by stopping the print head 16 on the print completion position (FIG. 13C).

Figure 13C:
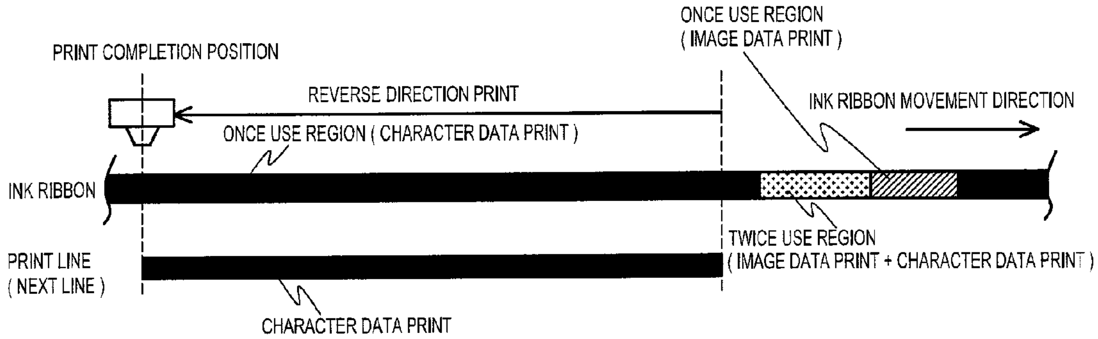
FIG. 13C is a third diagram for explaining a print operation of steps S12→S16→S18 in embodiment 2.

Moreover, in the time of the reverse direction print of FIG. 13C, although it becomes the character data print that uses the ink ribbon of once use and the ink ribbon of twice use, because print duty is low in the case of the character data print comparing with the case of the image data print, print density unevenness in the same line is restrained to a degree capable of being ignored in the time of the character data print.

(Effect of Embodiment 2)

According to the print apparatus 2 of the embodiment 2 that is mentioned above in detail, because a print apparatus that prints by moving a print head with respect to an ink ribbon that is rotated and transported in a predetermined direction, comprises a controller that performs overprint by moving the print head in a reverse direction opposite to the predetermined direction and by making divisions in one direction for a plurality of times in the case that print duty of both the print line and the line just before the print line are both over a predetermined threshold, adding to the effect of the embodiment 1, it is possible to prevent print density unevenness in the same line through repetition of using one part of the ink ribbon in the time of the one direction print.

The utilization possibility in industry:

As stated above, in the present embodiment, as analysis of print data, a judgment of whether or not print duty of a print line is over a predetermined threshold, is performed. However, it may also be judged in the kind of an image (for example, photograph and the like), and it may also be judged on the condition that mode of high quality mode, graphics mode and the like is set.

Further, it is possible for the present invention to be used in the print apparatus of serial impact dot matrix method, and it is also possible to be widely used in the print apparatus of thermal method that uses ribbon.

The present invention is not limited to the foregoing embodiments but many modifications and variations are possible within the spirit and scope of the appended claims of the invention.

What is claimed is:

1. A print apparatus printing by moving a print head with respect to an ink ribbon conveyed in a predetermined direction, the print head capable of moving in the predetermined direction and a reverse direction of the predetermined direction, comprising:

a controller analyzing print data, and performing one direction printing by moving the print head in the reverse direction of the predetermined direction based on an analysis result, the controller, in a case where both a print duty of a print line and a print line just before the print line are greater than or equal to a predetermined threshold, controlling printing by moving the print head in the reverse direction of the predetermined direction and by making divisions in one direction for a plurality of times.

2. A print apparatus performing printing on a printing medium conveyed, comprising:

an ink ribbon moving in a direction substantially perpendicular to a conveyance direction of the printing medium and substantially parallel to the printing medium;

a print head printing on the printing medium through the ink ribbon; and a controller controlling printing by moving the print head in the direction or in an other direction reverse of the direction based on an analysis result of print data, the controller controlling the printing of a predetermined line of the print data by moving the print head in the other direction when a predetermined print mode is detected with respect to the print data.

3. The print apparatus according to claim 2, wherein the predetermined print mode is a high-density print mode of when a print duty is greater than or equal to a predetermined threshold.

4. The print apparatus according to claim 3, wherein the print duty is a percentage of the number of print dots to the total number of dots in a line.

5. The print apparatus according to claim 3, wherein, in a case where the print duty is greater than or equal to a predetermined threshold, the print head is moved to a terminating end point of print data, and thereafter, printing is performed by moving the print head in the other direction.

6. The print apparatus according to claim 3, wherein, in a case where the print duty is less than the predetermined threshold, printing is started by moving the print head to the terminating end point or a starting end point of the print data whichever closer to the print head.

7. The print apparatus according to claim 3, wherein, in a case where the print duty of the predetermined line is greater than or equal to the predetermined threshold and also a line just before the predetermined line has a high print duty, the predetermined line is printed by the path division printing.

8. The print apparatus according to claim 7, wherein the path division printing is to perform printing by dividing the line into a plurality of paths, and in all of a plurality of path printings, printing is performed by moving the print head in the other direction.

9. The print apparatus according to claim 7, wherein the high print duty is a print duty that is greater than or equal to the predetermined threshold.

10. The print apparatus according to claim 2, wherein the predetermined print mode is a predetermined kind print mode of when a kind of image of the print data is a predetermined kind.

11. The print apparatus according to claim 10, wherein the predetermined kind of image is a photograph.

12. The print apparatus according to claim 2, wherein the predetermined print mode is a high-quality print mode or a graphics print mode.

* * * * *